United States Patent
Matsuzawa

(10) Patent No.: US 12,417,783 B1
(45) Date of Patent: Sep. 16, 2025

(54) MAGNETIC DISK DRIVE

(71) Applicants: Kabushiki Kaisha Toshiba, Tokyo (JP); Toshiba Electronic Devices & Storage Corporation, Tokyo (JP)

(72) Inventor: Takuji Matsuzawa, Kashiwa Chiba (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/829,105

(22) Filed: Sep. 9, 2024

(30) Foreign Application Priority Data

Mar. 18, 2024 (JP) .................................. 2024-041925

(51) Int. Cl.
  *G11B 5/56* (2006.01)
  *G11B 5/012* (2006.01)
  *G11B 5/55* (2006.01)

(52) U.S. Cl.
  CPC ............ *G11B 5/5578* (2013.01); *G11B 5/012* (2013.01); *G11B 5/556* (2013.01)

(58) Field of Classification Search
  CPC ..... G11B 5/5552; G11B 5/5556; G11B 5/556; G11B 5/54; G11B 5/59633; G11B 5/59638; G11B 5/56; G11B 5/58
  USPC .................................... 360/75, 77.01, 78.05
  See application file for complete search history.

(56) References Cited

U.S. PATENT DOCUMENTS

| | | | |
|---|---|---|---|
| 5,072,318 A | 12/1991 | Yu | |
| 6,483,659 B1 | 11/2002 | Kobayashi et al. | |
| 7,031,099 B2 | 4/2006 | Kohso et al. | |
| 7,054,094 B2 | 5/2006 | Zhang et al. | |
| 8,363,350 B2 * | 1/2013 | Matsuzawa | G11B 5/5552 360/78.05 |
| 8,503,124 B2 | 8/2013 | Uchida et al. | |
| 10,891,979 B1 | 1/2021 | Ryan et al. | |
| 2002/0093754 A1 | 7/2002 | Zhang et al. | |
| 2003/0030937 A1 | 2/2003 | Kohso et al. | |

FOREIGN PATENT DOCUMENTS

JP         2000-132929 A         5/2000

* cited by examiner

*Primary Examiner* — Nabil Z Hindi
(74) *Attorney, Agent, or Firm* — Kim & Stewart LLP

(57) ABSTRACT

According to one embodiment, a magnetic disk drive includes rotatable disks, heads, microactuators, a voice coil motor (VCM), and a control system, wherein the control system determines a final set of heads of target for simultaneously positioned on their respective target tracks from among the heads, by using at least a displacement amount of the microactuators, determines a target position of the VCM when the heads in the final set are simultaneously positioned on their respective target tracks, switches a controller of the VCM when the heads in the final set are simultaneously positioned on their respective target tracks, and switches controller of the microactuators included in each of the heads in the final set.

8 Claims, 12 Drawing Sheets

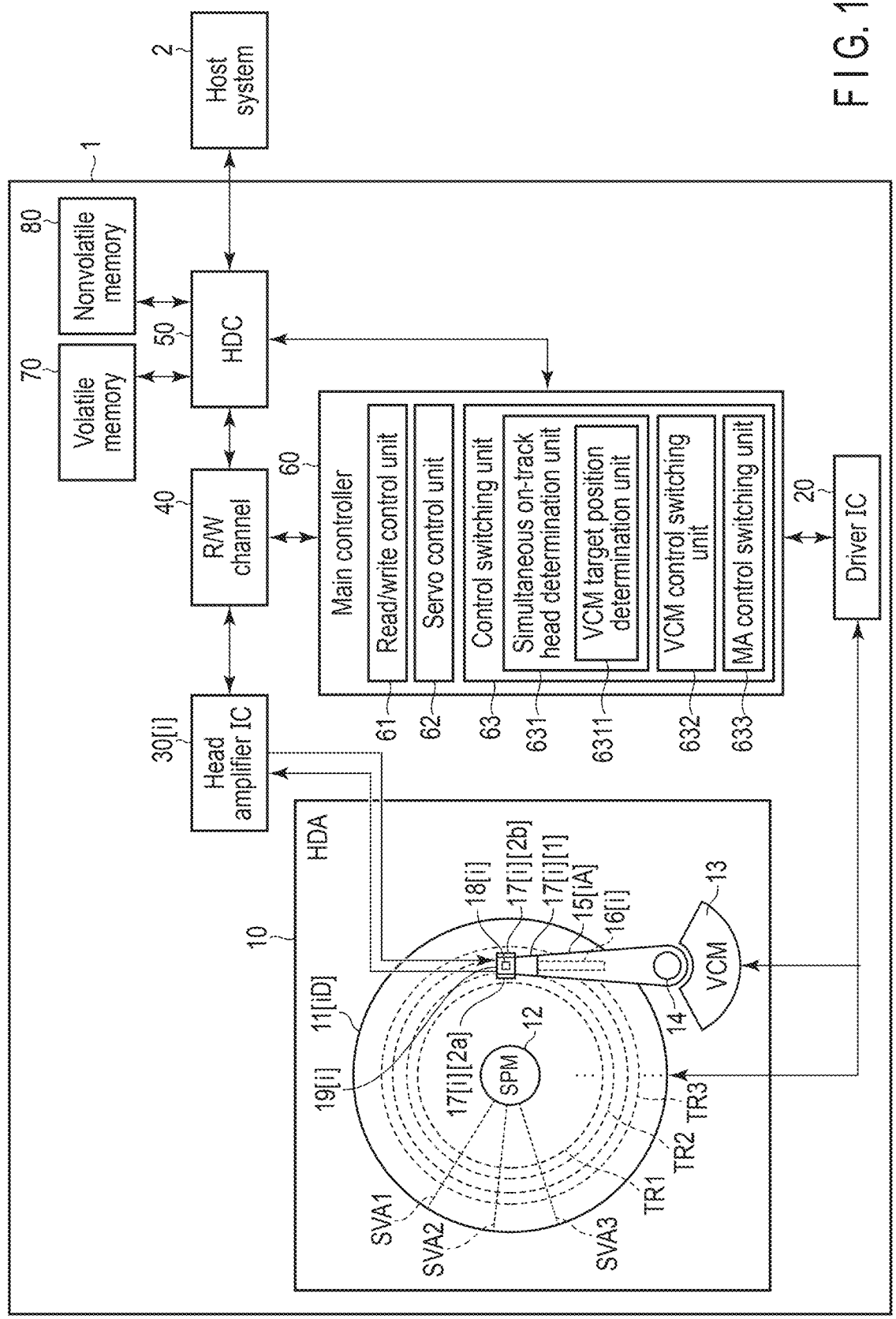
F I G. 1

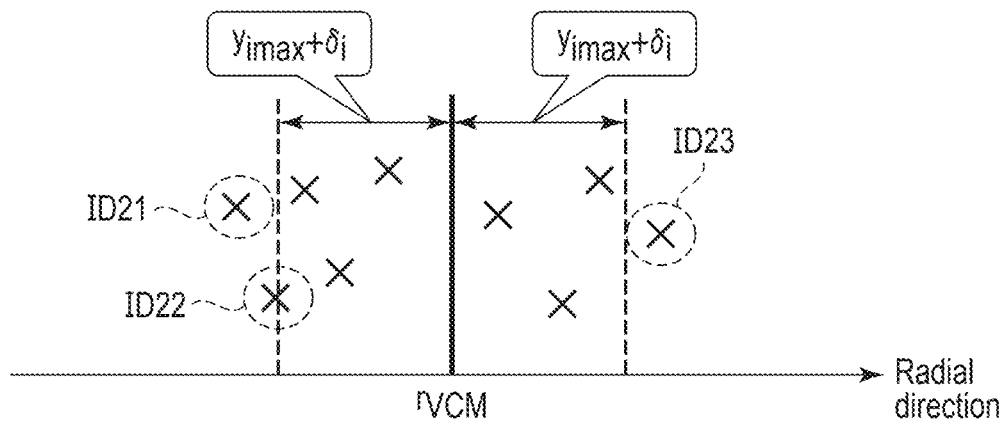
F I G. 10A
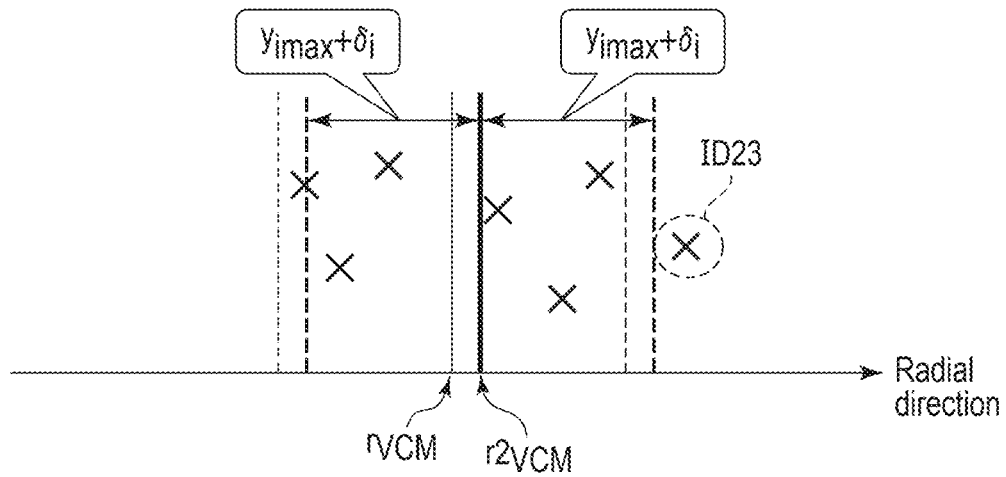
F I G. 10B
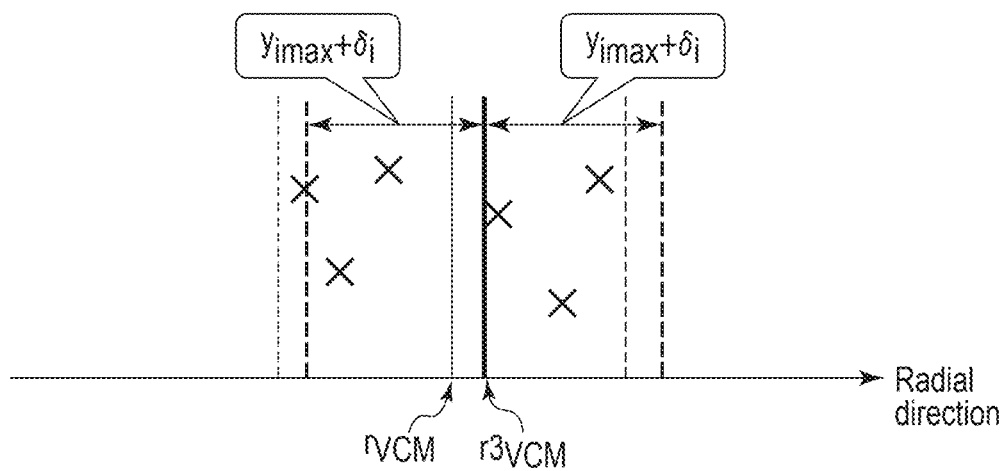
F I G. 10C

MAGNETIC DISK DRIVE

CROSS-REFERENCE TO RELATED APPLICATIONS

This application is based upon and claims the benefit of priority from Japanese Patent Application No. 2024-041925, filed Mar. 18, 2024, the entire contents of which are incorporated herein by reference.

FIELD

Embodiments described herein relate generally to a magnetic disk drive.

BACKGROUND

A multi-stage microactuator-type magnetic disk drive comprises a plurality of microactuators on a single head. In cases where the input voltages for all microactuators on all heads can be set independently, it becomes possible to read and write data simultaneously to different disk surfaces using multiple heads. However, application of a voltage with a large absolute value to the microactuators in this situation may lead to the degradation of the elements.

BRIEF DESCRIPTION OF THE DRAWINGS

FIG. 1 is a block diagram showing a configuration of a magnetic disk drive of a first embodiment.

Each of FIG. 8A, FIG. 8B.

Each of FIG. 10A, FIG. 10B, and FIG. 10C is a schematic diagram for explaining the method of the magnetic disk drive of the second embodiment selecting heads that are simultaneously positioned on their respective target tracks to perform read and write operations simultaneously from among the plurality of heads.

Each of FIG. 12A

DETAILED DESCRIPTION

Figure 2:
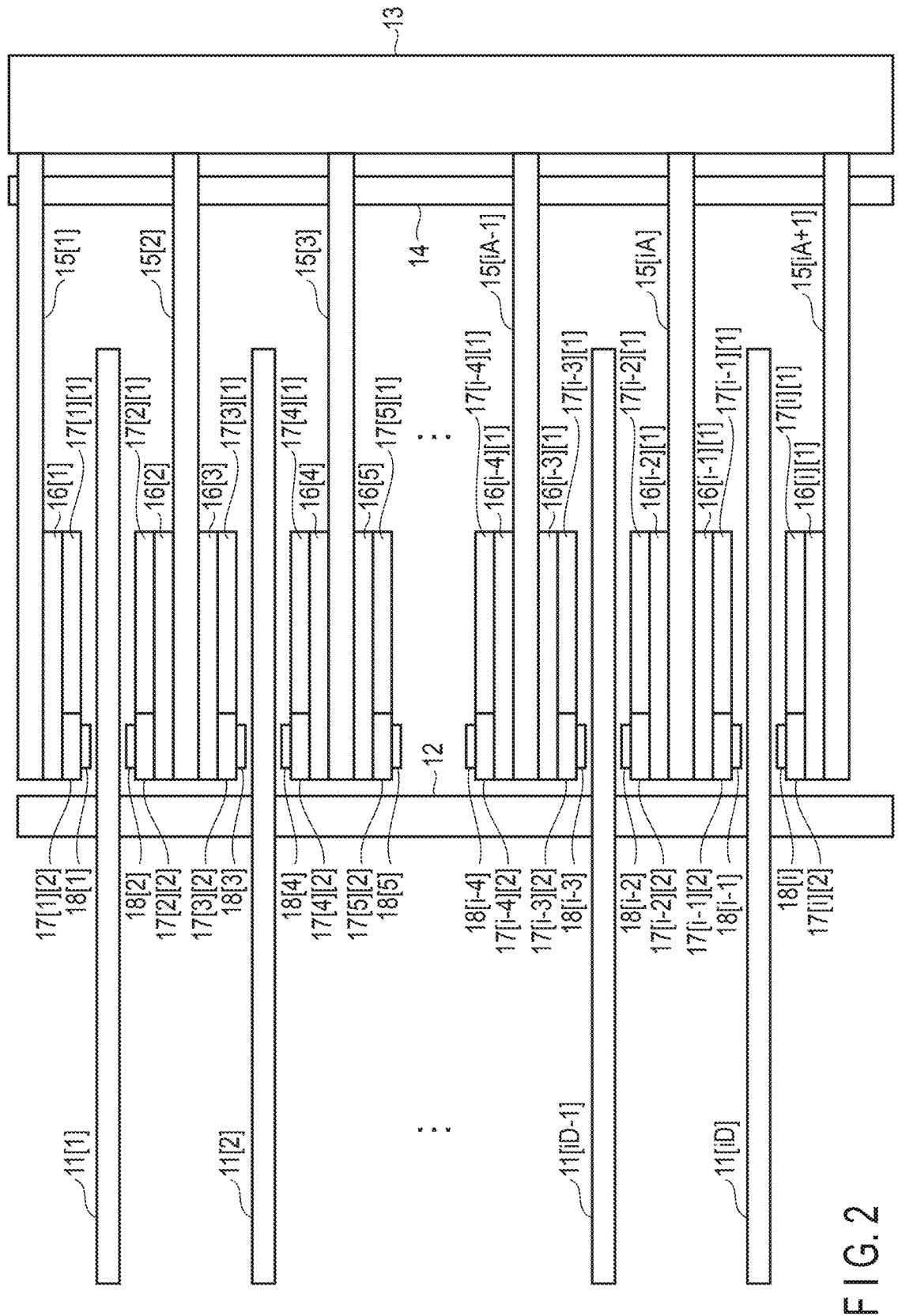
FIG. 2 is a schematic diagram showing an example of a multi-stage microactuator of the magnetic disk drive of the first embodiment.

In general, according to one embodiment, a magnetic disk drive, includes: a plurality of rotatable disks, each of the disks being a magnetic recording medium; a plurality of heads, each of the heads being capable of independently performing simultaneous read and write of data for a certain position of the plurality of disks; a plurality of microactuators, one or more of the microactuators being included in each of the plurality of heads and all of the microactuators being capable of driving independently; a voice coil motor (VCM) that moves the plurality of heads to a predetermined position on the disk; a simultaneous on-track head determination unit determining a final set of heads from among the plurality of heads, which are simultaneously positioned on their respective target tracks to perform read and write operations simultaneously, by using at least a displacement amount of the plurality of microactuators; a VCM target position determination unit determining a target position of the VCM when the heads in the final set are simultaneously positioned on their respective target tracks; a VCM control switching unit switching a controller of the VCM when the heads in the final set are simultaneously positioned on their respective target tracks; and a microactuator control switching unit switching controllers of the microactuators included in each of the heads in the final set determined by the simultaneous on-track head determination unit.

The present embodiment will be described hereinafter with reference to the accompanying drawings. The disclosure is merely an example in the following explanations and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

In the present embodiment, one head comprises a plurality of microactuators (hereinafter referred to as MA as well). The present embodiment shows an example of a magnetic disk drive (Hard Disk Drive: HDD) that has a configuration capable of independently applying a voltage to each of the MAs, while each of a plurality of heads simultaneously positioned on their respective target tracks to perform read and write operations simultaneously.

Application of a voltage of a large absolute value to a MA may lead to degradation of elements. Thus, when each of the plurality of heads is simultaneously positioned on their respective target tracks, the magnetic disk drive of the present embodiment simultaneously considers an input voltage to each of the plurality of MAs controlling each of the plurality of heads to control the plurality of heads. More specifically, a restriction of a voltage (maximum voltage which can be input) to each of the MAs is considered to control the input voltage to each of the MAs, and the plurality of heads are used to perform read and write operation simultaneously.

FIG. 1 is a configuration diagram of the magnetic disk drive of the present embodiment.

A magnetic disk drive 1 is a storage device comprising a magnetic disk 11 (hereinafter simply referred to as a disk as well) to which data is written and from which data is read, a processing device, for example, a processor having a computing function such as arithmetic processing, and various memories. The magnetic disk drive 1 outputs data to a host system 2 and writes data input from the host system 2 into the disk 11 based on a command received from the host system 2 to which the disk device 1 is connected and the like. FIG. 1 shows one disk and one head. However, the magnetic disk drive 1 comprises a plurality of disks and a plurality of heads as to be described later.

The host system 2 is, for example, a PC and outputs a read command, which is a read instruction of data of the disk 11, a write command, which is a write instruction of data and the like to the magnetic disk drive 1, together with data to be written into the disk. The host system 2 may output information on a sampling period of servo information, the information being included in the disk 11 of the magnetic disk drive 1, and may specify this output information for the magnetic disk drive 1.

A HDA 10 is referred to as a head disk assembly. A casing of the head disk assembly stores the magnetic disk 11, a spindle motor (hereinafter referred to as a SPM as well) 12, an arm 15 on which a head 19 is mounted, a voice coil motor (hereinafter referred to as VCM as well) 13, and the like. FIG. 1 shows a case where the HDA 10 includes one disk 11 and one head 19. However, the HDA 10 may include one or more disks 11 and one or more heads 19.

The disk 11 is a disk-type magnetic rotary disk storage medium, and a user data area available from a user and a system area in which information necessary for system management is written are allocated to a data area in which data can be written. Hereinafter, the direction orthogonal to the radial direction of the disk 11 is referred to as a circumferential direction. The disk 11 is attached to the spindle motor 12 and rotates by driving of the spindle motor 12. The magnetic disk drive 1 comprises the plurality of disk 11. Thus, for example, an iD-th disk (iD is a natural number) is referred to as a disk 11 [iD]. iD is used as an identification number to identify the iD-th disk 11 among the plurality of disks 11. The iD may be regarded as a variable and may be regarded as any disk 11 among the plurality of disks 11.

A plurality of tracks are set in the disk 11. In FIG. 1, three tracks TR1, TR2, and TR3 (when not particularly distinguished, any of these referred to as a track TR) are illustrated as an example. However, a plurality of tracks are set concentrically around the spindle motor 12 in the data area. When read and write (reading/writing) of data of the disk 11 is executed, the head 19 is moved to the track TR on which data to be read/written (also referred to as target data) is present by seek control, tracking control, or the like, and the head 19 executes read and write of the data. The track TR having the target data may be referred to as a target track.

Servo information, which is used to detect a location of the head 19, is written in the disk 11. The servo information is provided in a predetermined location (referred to as a servo area) in the circumferential direction of the disk 11. The servo information has general contents, and thus detailed description thereof will be omitted. In the example of FIG. 1, three servo areas SVA1, SVA2, and SVA3 (when not particularly distinguished, any of these is referred to as a servo area SVA) are illustrated as an example of the servo area. However, it should be noted that in general, the servo areas SVAs are arranged at equal intervals in the entire circumferential direction of the disk 11, and the servo information is written in the servo area SVA of each track TR. The magnetic disk drive 1 can detect a current position (head position) of the head 19 using the servo information read by the head 19.

The spindle motor 12 (SPM 12) is a support structure of the disk 11, and is installed in the casing of the magnetic disk or the like. When the spindle motor 12 rotates, the disk 11 rotates.

The VCM 13 is a voice coil motor type actuator, and is used to move the arm 15 and the like. The VCM 13 controls an operation of the arm 15 and the like based on an input current or voltage.

A pivot 14 is a bearing for supporting the arm 15 and the like and causing the arm to rotate or the like.

The arm 15 is an arm that supports a slider 18 and the head 19, transmits driving force from the VCM 13 to the head 19, and moves the head 19 to the target track TR. The magnetic disk drive 1 comprises a plurality of arms 15 corresponding to the plurality of heads 19. Thus, for example, an iA-th arm (iA is a natural number) is referred to as an arm 15 [iA].

The microactuator 17 is connected to the suspension 16. The magnetic disk drive 1 comprises a plurality of suspensions 16 corresponding to the plurality of heads 19. Thus, for example, a suspension corresponding to an i-th head (i is a natural number) is referred to as a suspension 16 [i]. i is indicative of a number allocated to the head 19. The suspension 16 is included in each of the heads 19. Thus, the number i for the head 19, to which the suspension is connected, is used as the number for the suspension 16.

The microactuator 17 (sometimes referred to as a MA 17) performs accurate position adjustment such as tracking control of the head 19 based on an input current or voltage. The microactuator 17 has a general function and thus detailed description thereof will not be described. The microactuator 17 executes fine adjustment of a position at the time of settling after seek control, and tracking control with respect to the target track after the seek control on the head 19. The settling is a time until a positioning error with respect to the target track falls within, for example, a certain threshold or less after the movement of the head 19 by the seek control, including the influence of the vibration of the head 19 by the seek control. After the vibration of the head 19 is sufficiently reduced by settling, data read and write and tracking control are executed.

In the magnetic disk drive 1 of the present embodiment, each of the plurality of heads 19 comprises one or more MAs 17 for controlling itself. Thus, for example, all of MAs controlling the i-th head 19 is referred to as a MA 17 [i] by using the i, the number for the head 19. Furthermore, the magnetic disk drive 1 comprises a plurality of MAs 17 corresponding to one head 19. Thus, for example, a j-th MA (j is a natural number) that controls the i-th head 19 is referred to as an MA 17 [i] [j]. For example, as shown in FIG. 1, the j-th MA may include a pair of piezoelectric elements, the elements being provided on right and left side, respectively. In that case, index such as ja or jb is added to the piezoelectric element. In FIG. 1, the piezoelectric elements that constitute the second MA corresponding to the head 19 [i], which performs read and write for the disk 11, are referred to as an MA 17 [i] [2a] and an MA 17 [i] [2b]. The MA 17 [i] [2a] and the MA 17 [i] [2b], as a pair, constitute an MA 17 [i] [2].

The head 19 is mounted on the slider 18. The magnetic disk drive 1 comprises the plurality of sliders corresponding to the plurality of heads 19. Thus, for example, a slider corresponding to the i-th head 19 [i] is referred to as a slider 18 [i].

The head 19 writes data into the disk 11 and reads data recorded on the data track of the disk 11. The magnetic disk drive 1 comprises the plurality of heads 19 corresponding to the plurality of disks 11. Thus, for example, the i-th head 19 (i is a natural number) is referred to as the head 19 [i] in order to specify an individual head 19. i is used as an identification number to identify the head 19 among the plurality of heads 19. i may be regarded as a variable and may indicate any head 19 among the plurality of heads 19. In particular, in the case of distinction, the head that writes data into the disk 11 is referred to as a write head 19W, and the head that reads data stored in the data track of the disk 11 is referred to as a read head 19R.

A driver IC 20 outputs a current or a voltage for driving and controlling the SPM 12, the VCM 13, the MA 17, and the like according to control from the HDC 50, a servo control unit 62, and the like.

A head amplifier IC 30 comprises a read amplifier and a write driver. The read amplifier amplifies a read signal read from the disk 11 and outputs this amplified read signal to an R/W channel 40. The write driver outputs, to the head 19, a write current corresponding to a signal output from the R/W channel 40. The magnetic disk drive 1 comprises a plurality of head amplifiers IC 30 corresponding to the plurality of heads 19. Thus, for example, a head amplifier IC corresponding to the i-th head 19 [i] is referred to as a head amplifier IC 30 [i].

The R/W channel 40 performs controls to the head amplifier IC 30 such as read of data from the disk 11 and write of data to the disk 11 in response to instructions from the HDC 50, the main controller 60, and the like. The R/W channel 40 receives a read data signal received from the head amplifier IC 30 and extracts read data, or generates a write data signal based on write data and the like instructed to write and outputs this write data signal to the head amplifier IC 30. Furthermore, the R/W channel 40 has a function of measuring the signal quality of the read data received from the head amplifier IC 30. The R/W channel 40 may extract position information of the head 19 based on a servo information signal received from the head amplifier IC 30.

The HDC 50 is an interface between the magnetic disk drive 1 and the host system 2, and is a hard disk controller that controls each part of the magnetic disk drive 1. The HDC 50 may include processing units (processors) having an arithmetic function such as a CPU, an IC chip comprising other processing device functions and various types of memories, a system LSI, an FPGA, and the like. Various processing in the HDC 50 may be executed by a program of software (including firmware and the like), or may be provided as hardware, or a combination of software and hardware.

The HDC 50 receives commands from the host system 2, such as a command to write data to the disk 11 and a command to read data from the disk 11, for example. The HDC 50 controls each unit of the magnetic disk drive 1 and transmits data between the host system 2 and the R/W channel 40 based on the received command. The HDC 50 may control reading/writing of data from/to a volatile memory 70, a nonvolatile memory 80, and the like.

The main controller 60 is a main controller controlling each part of the magnetic disk drive 1 and may be configured by, for example, a processing device (processor) such as a CPU having computing functions such as arithmetic processing, an IC chip having other processing device functions and various types of memories, a system LSI, an FPGA, and the like. Various processing of the main controller 60 may be executed by a program of software (including firmware and the like), or may be provided as hardware, or a combination of software and hardware.

Based on the command received from the host system 2 and the like, a read and write control unit 61 selects a storage destination of write data (for example, information such as a data sector and a track of the disk 11), and controls a write operation of data to the disk 11. Based on the command received from the host system 2 and the like, the read and write control unit 61 notifies a servo control unit 62 and the like of a storage destination (for example, information such as a data sector and a track of the disk 11) of read data, and controls a read operation of data of the disk 11.

The servo control unit 62 controls the head 19, for example, based on the command received from the host system 2 and the like. For example, the servo control unit 62 controls the VCM 13 via the driver IC 20 to execute the seek control and the tracking control for moving the head 19 [i] to a target position (target track) ri. Furthermore, the servo control unit 62 controls the MA 17 [i] via the driver IC 20 to execute tracking control of the head 19 [i].

More specifically, the servo control unit 62 determines an input current value or an input voltage value as a control input for the seek control and the tracking control of the head 19 [i] based on the target position $r_i$ of the head 19 [i] determined based on a command received from the host system 2 and the head position of the head 19 received from the R/W channel 40. Then, the servo control unit 62 outputs the control inputs to the VCM 13 and the MA 17 [i].

A control switching unit 63 comprises a simultaneous on-track head determination unit 631, an MA control switching unit 633, and a VCM control switching unit 633. The simultaneous on-track head determination unit 631 further comprises a VCM target position determination unit 6311. The VCM target position determination unit 6311 determines a target position $r_{VCM}$ of the VCM 13. The method of determining the $r_{VCM}$ will be described later.

The simultaneous on-track head determination unit 631 determines heads 19 which are to be simultaneously positioned on their respective target tracks from among the plurality of heads based on the target position $r_i$ of the head 19 with simultaneous read and write request and the total maximum displacement of the MA 17 [i]. The set of the heads 19 which are to be simultaneously positioned on their respective target tracks, is referred to as a set A.

The displacement amount of the MA 17 represents the moving distance in the radial direction of the head 19 controlled by the MA 17. A voltage input to the MA 17 in order to move the head 19 by the displacement amount is referred to as a microactuator control voltage. The maximum displacement amount of the MA 17 represents the displacement amount in a case where the maximum voltage which can be input is applied to the MA 17. The total displacement amount of the MA 17 [i] represents the sum of the displacement amounts of all of the MAs 17 [i] [j] in the head 19 [i].

The total maximum displacement amount of each of the MAs 17 [i] represents the sum of the maximum moving distance of the head 19 [i] that can be moved by each of the MAS 17 [i] [j] and depends on the maximum voltage that can be input to each of the MAs 17 [i] [j].

The simultaneous on-track head determination unit 631 calculates a total maximum displacement amount $y_{imax}$ of the MA 17 [i] of the head 19 [i] and removes the head 19 [i] that satisfies a predetermined condition from the set A. The method of determining $y_{imax}$ will be described later.

For example, the simultaneous on-track head determination unit 631 calculates a difference di between the $r_{VCM}$ and the target track $r_i$ of the head 19 [i] and removes head 19 [i] that satisfies $di \geq y_{imax} + \delta_i$ in the descending order of a value of $di - (y_{imax} + \delta i)$ from the set A.

The VCM target position determination unit 6311 recalculates the $r_{VCM}$ for the heads 19 [i] in the set A. The simultaneous on-track head determination unit 631 recalculates a di using the recalculated $r_{VCM}$ and repeats the recalculation until there is no head 19 [i] that satisfies $di \geq y_{imax} + \delta_i$ in the set A. In the end, the set A (referred to as a final set A) of heads 19, which are simultaneously positioned on their respective target tracks, is obtained.

The MA control switching unit 633 determines how to apply a voltage to one or more MAs 17 that are included in each of the head 19, which controls the head. In addition, in the plurality of heads 19 [i] that are simultaneously positioned on their respective target tracks, the MA control switching unit 633 determines, based on the maximum displacement amount of the each of the MAs 17 [i] [j] of each of the heads 19 and the VCM target position, the MA 17 [i] [k] to which the maximum voltage $V_{ikmax}$ is applied in feed-forward control, and the MA 17 [i] [k] that switches the controller to a MA controller reflecting the controller of the VCM 13 and the MA 17 [i] [k] to which $V_{ikmax}$ is applied.

The VCM control switching unit 633 refers to the estimated position obtained from the position of any of the heads 19 in the final set A of the heads to be simultaneously positioned on their respective target tracks, the set A being determined by the simultaneous on-track head determination unit 631, and the displacement amount of the MA 17, switches the controller CV to a controller C~V dedicated for performing controlling using the VCM 13 alone and performs positioning control to the VCM target position using the VCM 13 alone. In this context, the controller $C_V$ is a VCM controller of a case where the VCM 13 and all of the MAs 17 [i] are used for controlling at the time of tracking only one head 19 (head 19 [i]) (when the $r_{VCM}$ matches the ri). When the plurality of heads 19 access simultaneously, the $r_{VCM}$ is different from the $r_i$ of the head 19 [i] in most cases. Thus, the $r_{VCM}$ needs to be controlled by the VCM 13 alone. The controller C~V is the VCM controller in this case. The controller C~V assumes that the controlling is performed by the VCM 13 alone and thus is different from the controller $C_V$, which assumes the use of the MA 17. The controller C~V can perform a certain degree of the positioning control using only the VCM 13.

The volatile memory 70 is a semiconductor memory whose stored data is lost when power supply is lost. The volatile memory 70 stores data and the like necessary for processing in the magnetic disk drive 1. The volatile memory 70 is, for example, a dynamic random access memory (DRAM) or a synchronous dynamic random access memory (SDRAM).

The nonvolatile memory 80 is a semiconductor memory that maintains stored data even when power supply is lost. The nonvolatile memory 80 is, for example, a NOR type or NAND type flash read only memory (FROM).

FIG. 2 is a schematic diagram showing an example of a multi-stage microactuator of the magnetic disk drive of the embodiment.

The magnetic disk drive 1 comprises one or more disks 11, controls the plurality of arms 15, each corresponding to a disk 11 by the VCM 13, and moves the arms 15 around a pivot 14 in the circumferential direction. The disk 11 has the top and bottom surfaces for each of which read and write can be performed. One disk 11, except for the top disk 11 [1] and the bottom disk 11 [iD], comprises the heads 19 at the top and bottom surfaces. For example, the top surface of a disk 11 [iD-1] is read/written by a head 19 [i-3] and the bottom surface of the disk 11 [iD-1] is read/written by a head 19 [i-2].

As the figures show about the arms 15, the head 19 and the like are connected to one side of the topmost and bottom arms 15. The head 19 and the like are connected to both sides of the other arms 15. Therefore, the number iD for the disk 11, the number i for the head 19, and the number iA for the arm 15 do not necessarily match with one another. For example, the heads 19 that performs read and write for a disk 11 [2] are a head 19 [3] and a head 19 [4], and the arms 15 to which these heads 19 are connected are an arm 15 [2] and an arm 15 [3], respectively.

The head 19 [i] is connected to the MA 17 [i] [1] through the MA 17 [i] [n], where j equals n (n is an integer greater than or equal to two), and its position is controlled. Basically, the number of MAS 17 [i] controlling the head 19 [i] is the same for all of the heads 19 [i] (for example, FIG. 2 shows a case where two MAs 17 are allocated to each of all heads 19).

Figure 3:
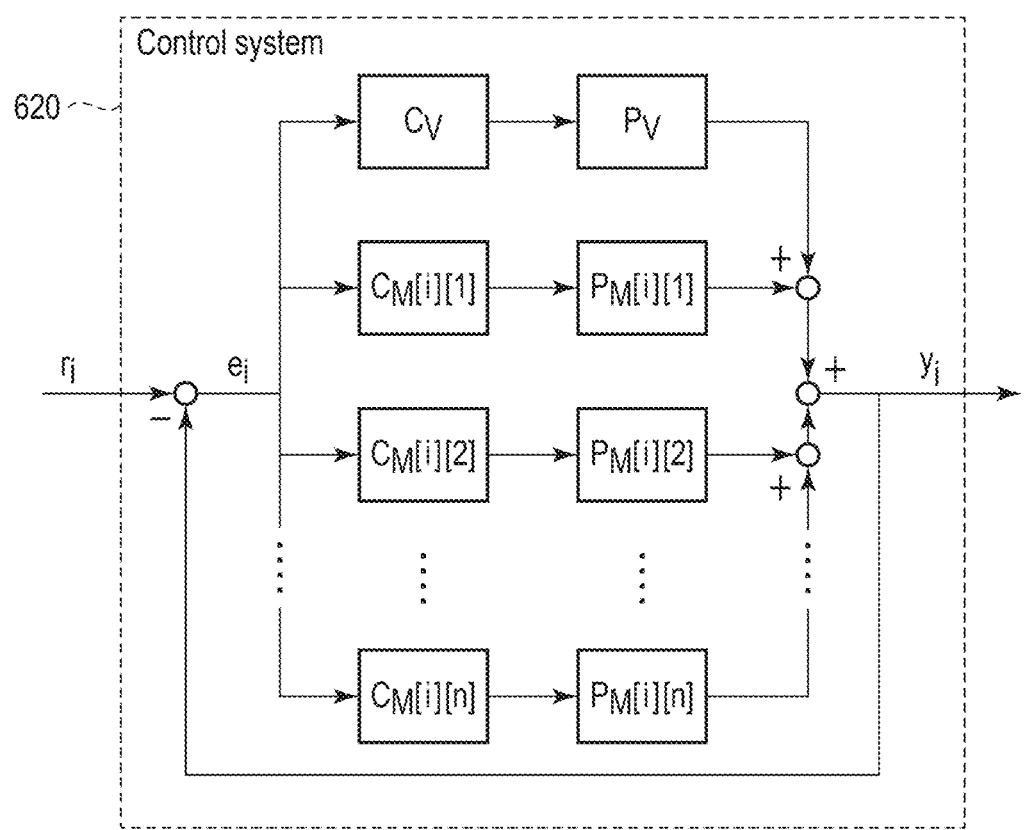
FIG. 3 is an example of a block diagram of a control system for controlling a VCM and the micoroactuators in the magnetic disk drive of the first embodiment, focusing on a head comprising a plurality of microactuators.

FIG. 3 is an example of a block diagram of a control system that controls the VCM 13 and the MAs 17 and shows a case where only one head 19 [i] that comprises the plurality of MAs 17 is positioned on the target track.

A control system 620 shows a control system for the head 19 [i] by the servo control unit 62 and has a transfer function between the target position $r_i$ of the head 19 [i] and the current position $y_i$ of the head 19 [i]. $r_i$ and $y_i$ indicate discrete time signals.

In the control system 620, $C_V$ indicates the controller that controls the VCM 13 or the transfer function of the controller. A $C_M$ [i] [1], a $C_M$ [i] [2], and a $C_M$ [i] [n] respectively indicate the controllers or their transfer functions that control the microactuators MA 17 [i] [1], the MA 17 [i] [2], and the MA 17 [i] [n], which are included in the i-th head [i]. The transfer function $P_V$ indicates the VCM 13 or the transfer function of the VCM 13. A PM [i] [1], a PM [i] [2], and a PM [i] [n] respectively indicate the microactuators MA 17 [i] [1], MA 17 [i] [2], and MA 17 [i] [n] included in the i-th head 19 [i] or the transfer function of these microactuators. The MA 17 [i] [1], the MA 17 [i] [2], and the MA 17 [i] [n] are referred to as the MA 17 [i] when not specifically distinguished.

The VCM controller and the MA controllers output control signals to the VCM 13 and the MA 17 [i] respectively, based on inputs such as a difference ei (referred to as a head position error) between the target position $r_i$ of the head 19 [i] and the current position $y_i$. The determined current or voltage is input to the VCM 13, and the VCM position based on a transfer function $P_V$ is output. The determined voltages are input to the MA 17 [i] [1], the MA 17 [i] [2], and the MA 17 [i] [n], respectively. The displacement amount of each of these microactuators based on transfer functions PM [i] [1], PM [i] [2], and $P_M$ [i] [n], respectively are output. The sum of these displacement amounts and the VCM position corresponds to the current position $y_i$.

Figure 4:
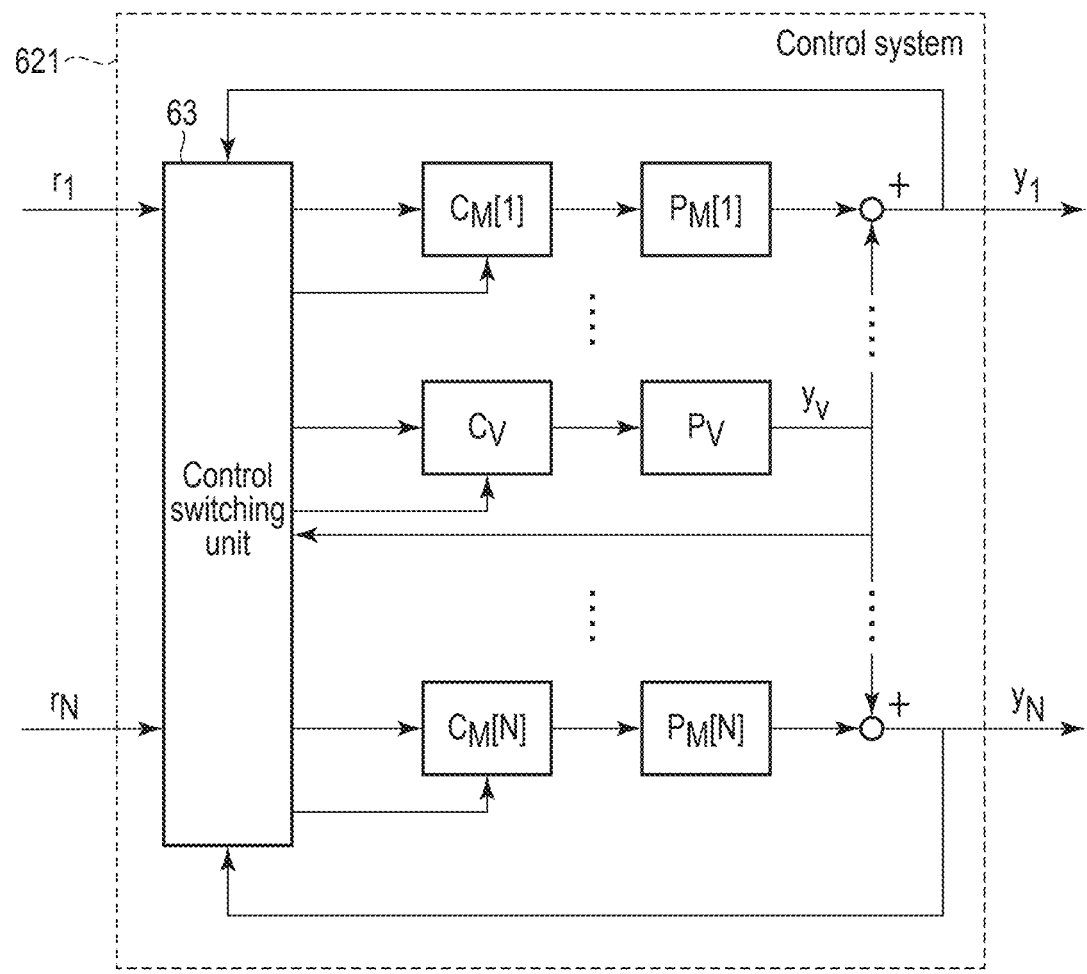
FIG. 4 is an example of a block diagram of a control system for controlling a VCM and the microactuators in the magnetic disk drive of the first embodiment and considers the plurality of heads and the plurality of microactuators.

FIG. 4 is an example of a block diagram of a control system for controlling the VCM and the microactuators in the magnetic disk drive of the embodiment and considers the plurality of heads 19 and the plurality of MAs.

A control system 621 represents a system that integrates N (N is an integer greater than or equal to two) control systems 620 for one head 19, through the servo control unit 62. For example, the control system 621 has a transfer function between the target position $r_N$ of a N-th head 19 [N] and a head position $y_N$ of the current head 19 [N]. $r_N$ and $y_N$ indicate discrete time signals.

In the control system 621, the $C_V$ indicates the controller that controls the VCM 13 or the transfer function thereof. The $C_M$ [1], the $C_M$ [2], and the $C_M$ [N] respectively indicate the controllers or their transfer functions that control the MAs 17, which are included in the first head 19 [1], the second head 19 [2], and the N-th head 19 [N] The transfer function $P_V$ indicate the VCM 13 or the transfer function thereof. The transfer functions $P_M$ [1], $P_M$ [2], and the $P_M$ [N] indicate the MAs 17 corresponding to the first head 19 [1], the second head 19 [2], and the N-th head 19 [N], respectively or the transfer functions of these MAs. The control system 620 in FIG. 3 corresponds to the controllers $C_M$ [i], $P_M$ [i], the $C_M$ and the $P_V$ that control one head (for example, the i-th head 19 [i]) in the control system 621.

In the control system 621, a head position error ei between the target position $r_i$ of the head 19 [i] and the current position $y_i$ and the target position $y_V$ of the VCM 13 are input per the controller $C_M$ [i] and the $P_M$ [i] for the i-th head 19 [i]. Further, the VCM voltage, current, or a microactuator voltage that are control signals are output for the VCM 13 and the MA 17 [i] that control the head 19 [i].

The control switching unit 63 determines the head 19 to be controlled among the plurality of heads 19, determines the target position of the VCM 13, determines how to supply current or voltage to the VCM 13, and determines how to supply voltage to the MAs 17.

Figure 5:
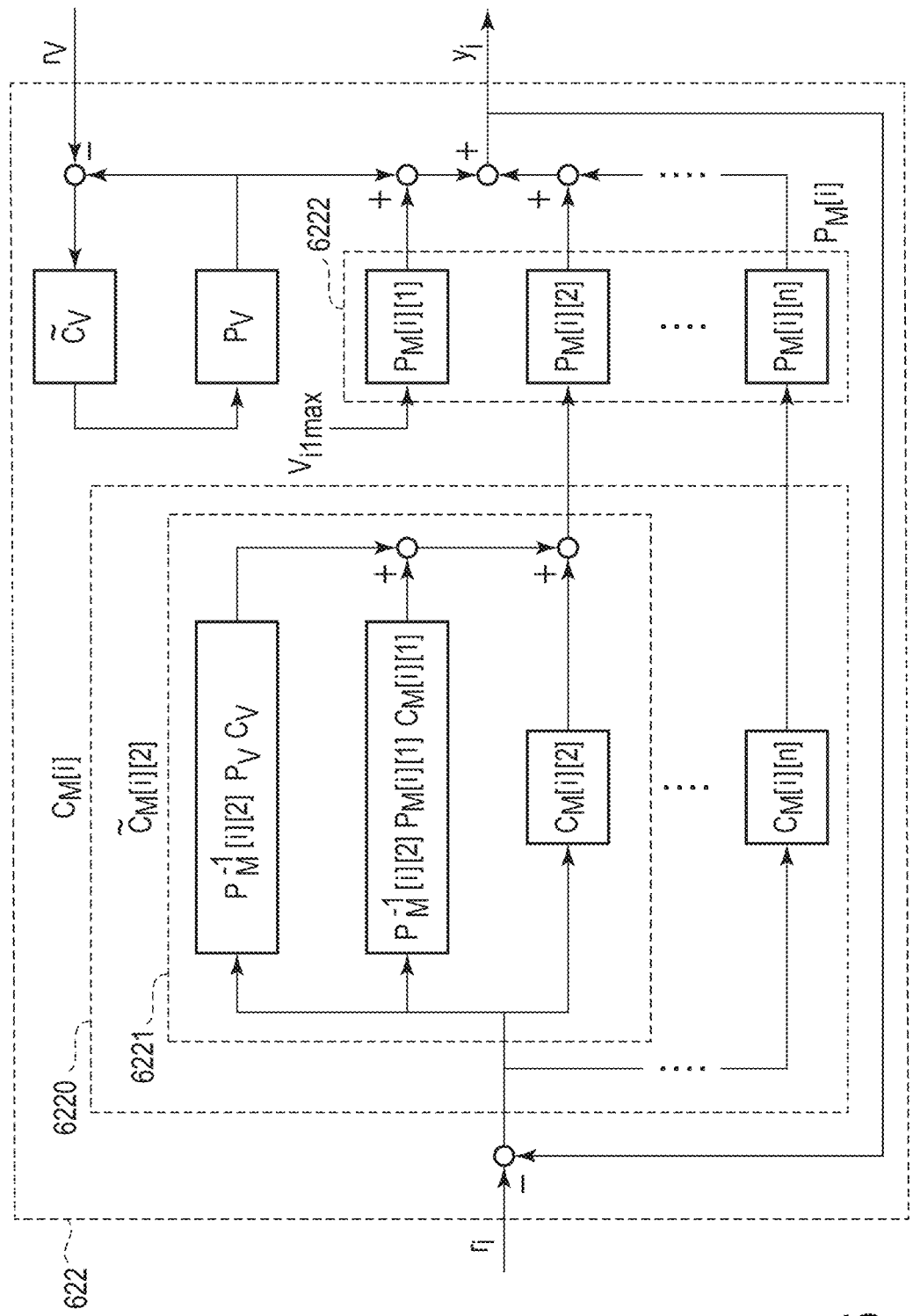
FIG. 5 is an example of a block diagram of the control system for controlling the VCM and the microactuators in the magnetic disk drive of the first embodiment, focusing on a head i comprising a plurality of microactuators.

FIG. 5 is an example of a block diagram of the control system that controls the VCM 13 and the MA 17 and focusing on one head 19 [i] that comprises the plurality of MAs 17 [i].

A control system 622 represents a control system for the head 19 [i] by the servo control unit 62 and has a transfer function between the target position $r_i$ of the head 19 [i] and the current position $y_i$ of the current head 19 [i]. $r_i$ and $y_i$ indicate discrete time signals.

In the control system 622, the $C_V$ indicates the controller that controls the VCM 13 or the transfer function thereof. The $C_M$ [i] indicates the controller that controls the MA 17 [i] included in the head 19 [i] or the transfer function thereof. The head 19 [i] comprises the plurality of MAs 17 [i] (for example, the MA 17 [i] [1], the MA 17 [i] [2], and the MA 17 [i] [n]). These MAs have transfer functions of the $C_M$ [i] [1], the $C_M$ [i] [2], the $C_M$ [i] [n], respectively, and the transfer functions of the $P_M$ [i] [1], the $P_M$ [i] [2], and the M [i] [n], respectively in the same manner as the controller system 620.

FIG. 5 shows a case where the transfer functions to the controllers for the $C_M$ [i] [2], which is the transfer function for the MA 17 [i] [2] is switched, in other words, the case where the $C_M$ [i] [2] is switched to the $C\~M$ [i] [2]. The method of determining $C\~M$ [i] [2] will be described later. In addition, $V_{ilmax}$ indicates the maximum voltage that can be input to the MA 17 [i] [1]. $V_{ijmax}$ is predetermined for each of the MAs 17 [i] [j]. $V_{ijmax}$ indicates the physical limit determined, for example, by the circuit limit or the configuration of the elements of the MA 17 [i] [j], and the like. Voltages higher than $V_{ijmax}$ cannot be applied to the circuit or such application, which may break the MA 17 [i] [j], must be avoided.

The operation of the present embodiment will be described below.

Figure 6:
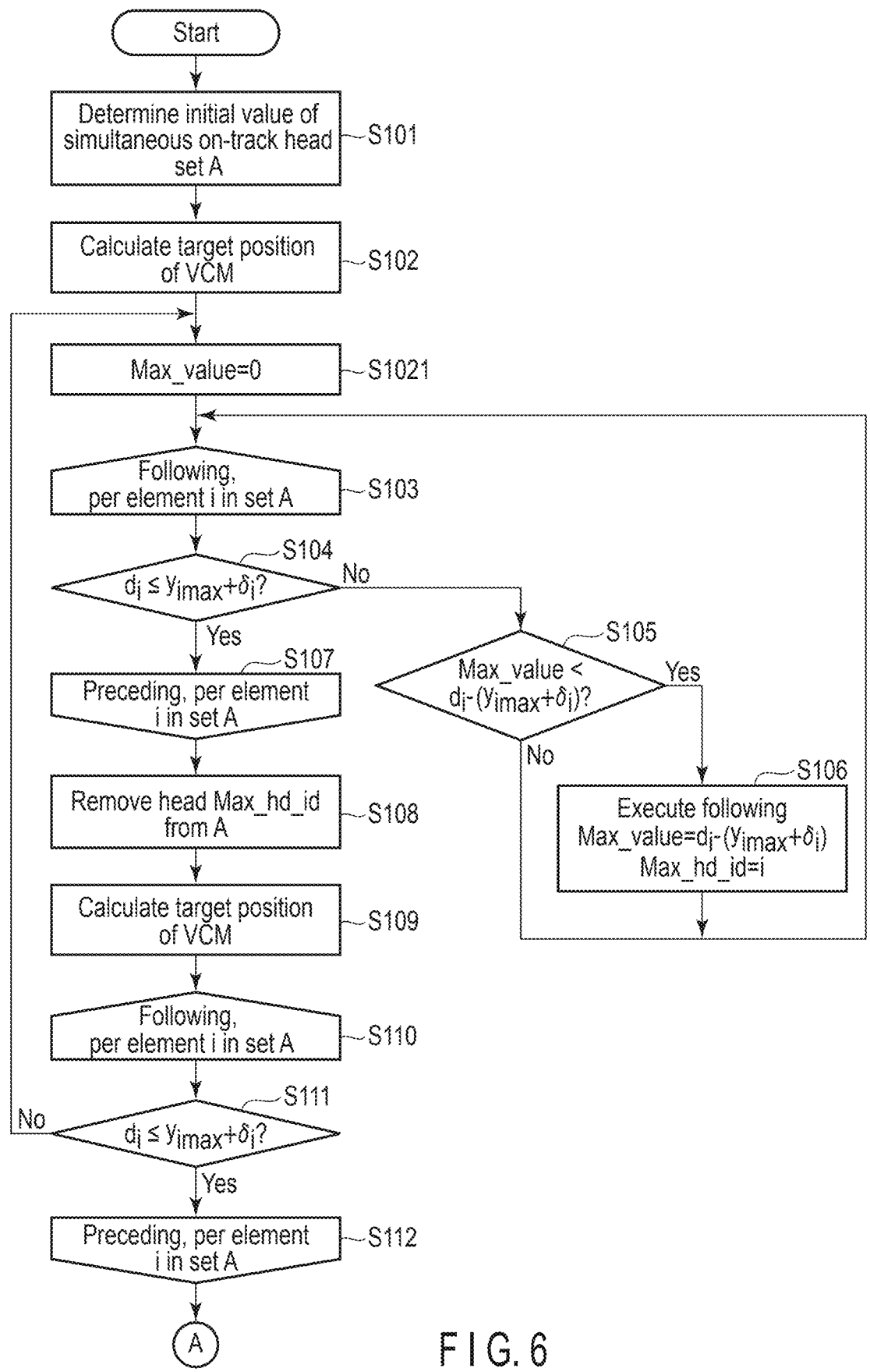
FIG. 6 is a first flowchart showing processing operations in a case where the magnetic disk drive of the first embodiment controls the plurality of heads.

FIG. 6 is a first flowchart showing processing operations in a case where the magnetic disk drive of the first embodiment controls the plurality of heads.

The simultaneous on-track head determination unit 631 is triggered by a simultaneous read and write request and the like to determine the set A, which includes the heads 19 to be simultaneously positioned on their respective target tracks and simultaneously made to perform read and write operations, as initial values and transmits the determined set A to the VCM target position determination unit 6311 (Step S101). In the step S101, the set A, which includes the heads 19 to be simultaneously positioned on their respective target tracks, may be specified by the host 2 in the simultaneous read and write request. Alternatively, the HDC 50 may analyze the data access request received from the host 2 to specify the heads 19 to be simultaneously positioned on their respective target tracks.

The VCM target position determination unit 6311 uses the target position $r_i$ of the heads 19 in the set A to calculate the target position $r_{VCM}$ of the VCM by Equation 1 (Step S102).

$$r_{VCM} = \frac{1}{|A|} \sum_{i \in A} r_i \qquad \text{Equation 1}$$

In this context, $r_i$ is the target position of the target track of the i-th head 19 [i]. |A| indicates the number of heads (number of elements) included in the set A.

In steps S103 and S107, processes are repeated for each of the heads 19 [i] in the set A using i as the variable. Prior to these processes, the variable Max_value used in the processes is initialized (Step S1021).

The simultaneous on-track head determination unit 631 calculates the difference di between the $r_{VCM}$ and the target position $r_i$ of the head 19 [i] by Equation 2 and the total maximum displacement amount $y_{imax}$ of the head 19 [i] by Equation 3, respectively, and verifies the conditional expression in Equation 4 (Step S104).

$$d_i = |r_i - r_{VCM}| \qquad \text{Equation 2}$$

$$y_{imax} = \sum_{j=1}^{n} |P_{Mij}||v_{ijmax}| \qquad \text{Equation 3}$$

In this context, j is a natural number and indicates the index for n MAs 17 [i] that control the head 19 [i]. In Equation 3, the MA 17 [i] [j] from (j=1 to n) is used.

$$d_i \leq y_{imax} + \delta_i \qquad \text{Equation 4}$$

$\delta_i$ is a displacement amount corresponding to the predetermined margin of the voltage to the i-th head 19 [i], and may be stored in advance in the nonvolatile memory 80 and the like.

The simultaneous on-track head determination unit 631 removes heads 19 [i] that do not satisfy Equation 4 from the set A in descending order of the value of di−($y_{imax}+\delta_i$) (Steps S103 to S107). The following is a specific example of the processes for the head 19 [i].

When the head 19 [i] does not satisfy Equation 4 (No in Step S104), the simultaneous on-track head determination unit 631 compares $d_i-(y_{imax}+\delta_i)$ with Max_value of an internal variable, and when $d_i-(y_{imax}+\delta_i)$ is greater than Max_value (Yes in Step S104), the simultaneous on-track head determination unit 631 sets Max_value=$d_i-(y_{imax}+\delta_i)$ being satisfied and assigns the index i of the head 19 at this time to Max_hd_id (Step S106). In the end, the simultaneous on-track head determination unit 631 identifies the head 19 [i] with the maximum value of $d_i-(y_{imax}+\delta_i)$, among the heads 19 [i] that do not satisfy Equation 3 and specifies Max_hd_id, which is the index of the head 19 in the above process and the like. The processes in the step S105 and S106 are examples and thus other methods may be adopted.

The simultaneous on-track head determination unit 631 removes a head 19 [Max_hd_id] with the specified Max_hd_id from the set A (Step S108).

Figure 8A:
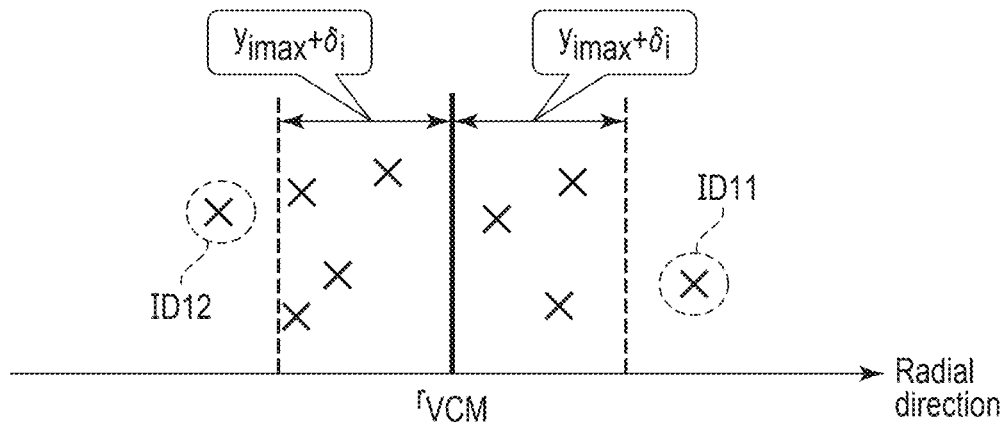
FIG. 8C is a schematic diagram for explaining method of the magnetic disk device of the first embodiment selecting heads that are simultaneously positioned on their respective target tracks to perform read and write operations simultaneously from among the plurality of heads.
Figure 8B:
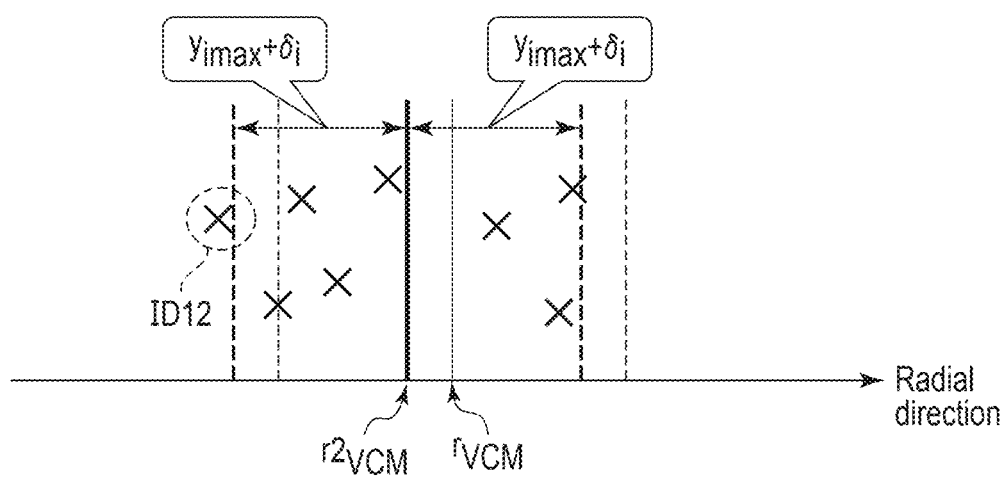
Figure 8C:
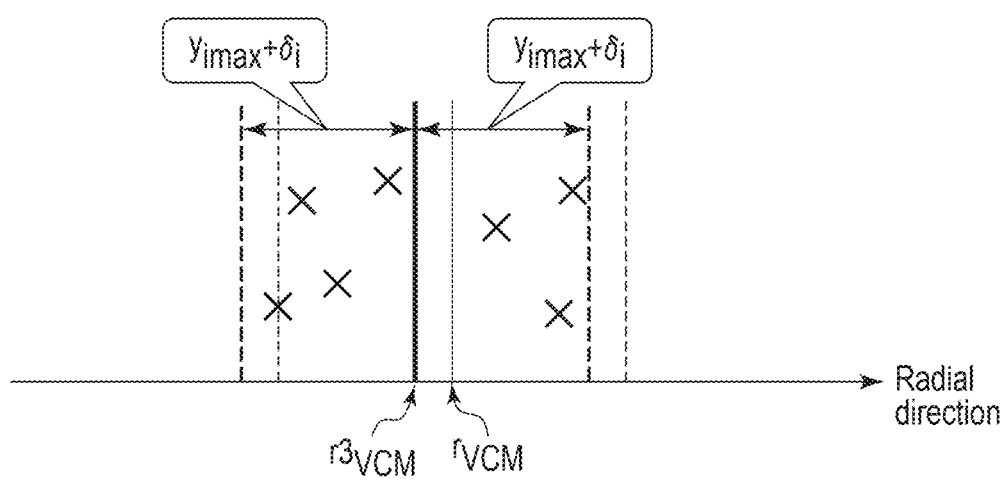

Each of FIG. 8A, FIG. 8B, and FIG. 8C is a schematic diagram for explaining method of the magnetic disk device of the first embodiment selecting a head to be processed among the plurality of heads. The horizontal axis indicates the radial direction, and the X marks indicate the positions of each of the heads 19 in the radial direction.

FIG. 8A shows the target position in the radial direction of the head 19 [i] in the set A, determined in the step S101. FIG. 8A shows, for example, a head 19 [ID11] and a head 19 [ID12] are out of the scope of $+(y_{imax}+\delta_i)$ centered on the $r_{VCM}$. For the sake of simplicity, $y_{imax}+\delta_i$ is common to all of the heads in FIG. 8A.

The simultaneous on-track head determination unit 631 identifies Max_hd_id=ID11 by executing the processes in the steps S103 to S107 and then removes the head 19 [ID11] from the set A in the step S108. FIG. 8B shows the set A after removing the head 19 [ID11].

The VCM target position determination unit 6311 calculates the target position $r_{VCM}$ (corresponding to a $r2_{VCM}$ in FIG. 8B) of the VCM for the heads 19 in the set A using Equation 1 (Step S109).

The simultaneous on-track head determination unit 631 determines whether there is a head 19 that does not satisfy the condition of Equation 4 using the $r_{VCM}$ calculated in the step S109 for the heads 19 in the set A (Step S111). FIG. 8B shows one head 19 [ID12] as an example of the head 19 in the set A that does not satisfy the condition of Equation 4.

When there is a head 19 that does not satisfy the condition of Equation 4 (No in Step S111), the processes in the step S103 to the step S107 are executed again to identify Max_hd_id in the set A. FIG. 8B shows a case where Max_hd_id=ID12 is selected.

The simultaneous on-track head determination unit 631 removes the head 19 [Max_hd_id] with the specified Max_hd_id from the set A (Step S108). Then the simultaneous on-track head determination unit 631 recalculates the target position $r_{VCM}$ of the VCM (corresponding to a $r3_{VCM}$ in FIG. 8C) for the set A (Step S109). In the same manner, the processes from the step S103 are repeated until all of the heads 19 in the set satisfy Equation 4.

In the case of FIG. 8B, the head [ID12] is removed from the set A. Thus, as shown in FIG. 8C, all of the heads 19 in FIG. 8B satisfy the condition of Equation 4 at this point as shown in FIG. 8C. By the above processes, the magnetic disk drive 1 of the present embodiment removes from the set A the head 19 whose total displacement amount, which is the sum of the displacement amounts of the MAs constituting the MA 17 of each of the heads 19, is less than the absolute value of the difference between the target position of the VCM 13 and the target position of the head 19 (the absolute value being obtained by Equation 2).

In the example in FIG. 8C, by removing the head 19 [ID11] and the head 19 [ID12] from the set A, only heads 19 that are provided in the scope of $\pm(y_{imax}+\delta_i)$ centered on the $r3_{VCM}$ as shown in FIG. 8C may remain in the set A. The above procedure determines the set A (final set A) of heads 19 to be actually positioned on their respective target tracks simultaneously to perform read and write and determines the target position $r_{VCM}$ of the VCM (corresponding to $r3_{VCM}$).

According to the above procedure, the magnetic disk drive 1 of the present embodiment controls the sum of the displacement amounts of all of the MA 17s that control the heads 19 in the set A (final set A) so as not to exceed the total maximum displacement amount $y_{imax}$ to which the sum of the maximum allowable voltage $V_{ijmax}$, which is predetermined for each of the MAs 17, is applied.

The following is the procedure for determining how to apply a voltage to the plurality of MAs 17 [i] for each of the heads 19 [i], which are elements of the final set.

Figure 7:
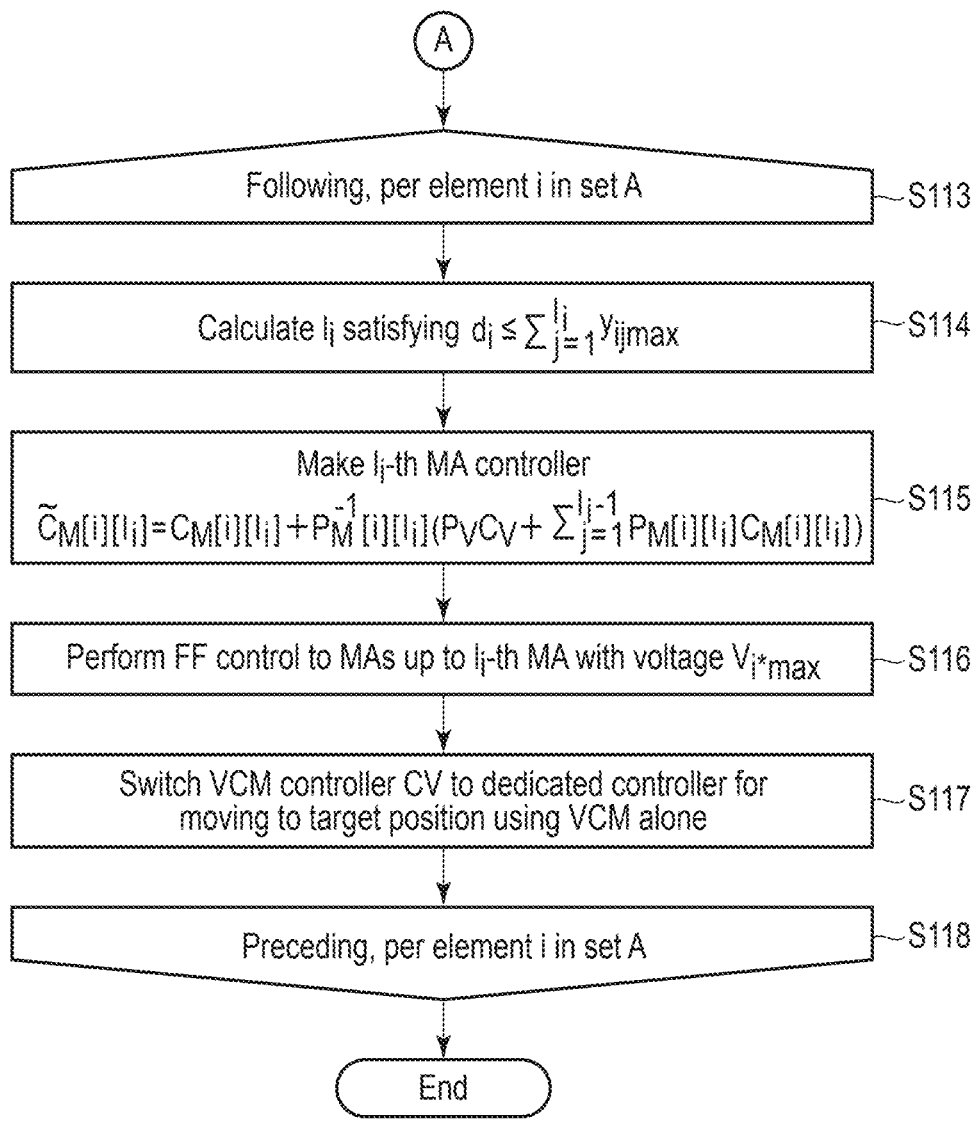
FIG. 7 is a second flowchart showing processing operations in a case where the magnetic disk of the first embodiment controls the plurality of heads.

FIG. 7 is a second flowchart showing processing operations in a case where the magnetic disk of the first embodiment controls the plurality of heads.

The following assume that the plurality of MAs [i] provided in the head 19 [i] are sorted according to the maximum displacement amount $y_{ijmax}$ and are numbered as the MA [i] [j] (j=1, 2, 3 . . . ) in the descending order of the maximum displacement amount.

For the heads 19 [i] in the final set A, in which the only heads 19 that satisfy $d_i \le y_{imax}+d_i$ remain, the MA control switching unit 633 compares the sum of the maximum displacement amount $y_{ijmax}$ (the maximum displacement amount $y_{imax}$ of the MA 17 [i]) and the displacement amount $d_i$, in order from the MA whose j=1, to calculate the minimum $l_i$ that satisfies Equation 5 (Step S114).

$$d_i \le \sum_{j=1}^{l_i} y_{ijmax} \qquad \text{Equation 5}$$

When $j=l_i$ is satisfied, the MA control switching unit 633 finds a controller $\tilde{C}_M$ [i] [$l_i$] after switching for an MA 17 [i] [$l_i$] by calculating Equation 6, considering the control system of the VCM and the MA [i] [j] that satisfy $j<l_i$ (Step S115).

$$\tilde{C}_M[i][l_i] = \\ C_M[i][l_i] + P_M^{-1}[i][l_i]\left(P_V C_V + \sum_{j=1}^{l_i-1} P_M[i][l_i]C_M[i][l_i]\right) \qquad \text{Equation 6}$$

The MA control switching unit 633 uses the $\tilde{C}_M$ [i] [$l_i$] as the controller of the MA 17 [i] [$l_i$] and performs positioning control of the head 19 [i].

When $j<l_i$ is satisfied, the $P_M$ [i] [j] is set in the feed-forward control and applies the maximum voltage $V_{ijmax}$ to the MA 17 [i] [j]. That is, the MA control switching unit 633 performs feed-forward control (FF control) for the MAs 17 [i] [j] up to j=($l_i$−1)th MA 17 with the voltage $V_{ijmax}$ (Step S116).

Based on the position of any of the heads 19 in the final set A and an estimated position obtained by the displacement amount of the MA 17, the VCM control switching unit 632 switches the controller to the controller $\tilde{C}$ V dedicated to the positioning control for the VCM 13 alone and performs the positioning control to the VCM target position using the VCM 13 alone. There is no sensor to detect the position of the VCM 13 and thus the position of the VCM 13 is unclear. Therefore, the estimated position is derived from the position of the head 19 and the displacement of the MA 17.

The control switching unit 63 performs the processes in the step S114 to the step S117 for all of the heads 19 in the final set A. By these processes, the control switching unit 63 determines first type microactuators that input the maximum voltage $V_{ijmax}$ that can be input for each of the MAs 17 [i] [j] by the feed-forward control and second type microactuators controlled by the controller of Equation (6) considering the control system of the VCM and the MA [i] [j] satisfying $j<l_i$, based on the maximum displacement amounts of the plurality of MAs 17 [i] that control the heads 19 [i] in the final set A. Then, the control switching unit 63 switches the controllers of these microactuators.

By the above procedure, the magnetic disk drive of the present embodiment controls the input voltage to all of the MAs 17 [i] [j] of the heads 19 [i] to be simultaneously positioned on their respective target tracks so as not to exceed the maximum voltage $V_{ijmax}$. In other words, accurate simultaneous positioning on their respective target tracks of the plurality of heads 19 [i] can be achieved considering stroke restriction of all of the MAs 17 [i] [j].

Second Embodiment

The present embodiment shows an example of a magnetic disk drive that uses a target position $r_{VCM}$ of a VCM as a reference to remove a head 19, which is the most significantly deviated in the radial direction among those that do not satisfy the condition of simultaneous positioning on their respective target tracks, from the set of heads for simultaneous positioning on their respective target tracks (set A). After removing this head, heads 19 in the same radial direction seen from the $r_{VCM}$ of the VCM as that of the head 19 removed first are regarded as candidates to be removed from the target of control until there are no more heads 19 that do not meet the condition of simultaneous positioning on their respective target tracks.

Figure 9:
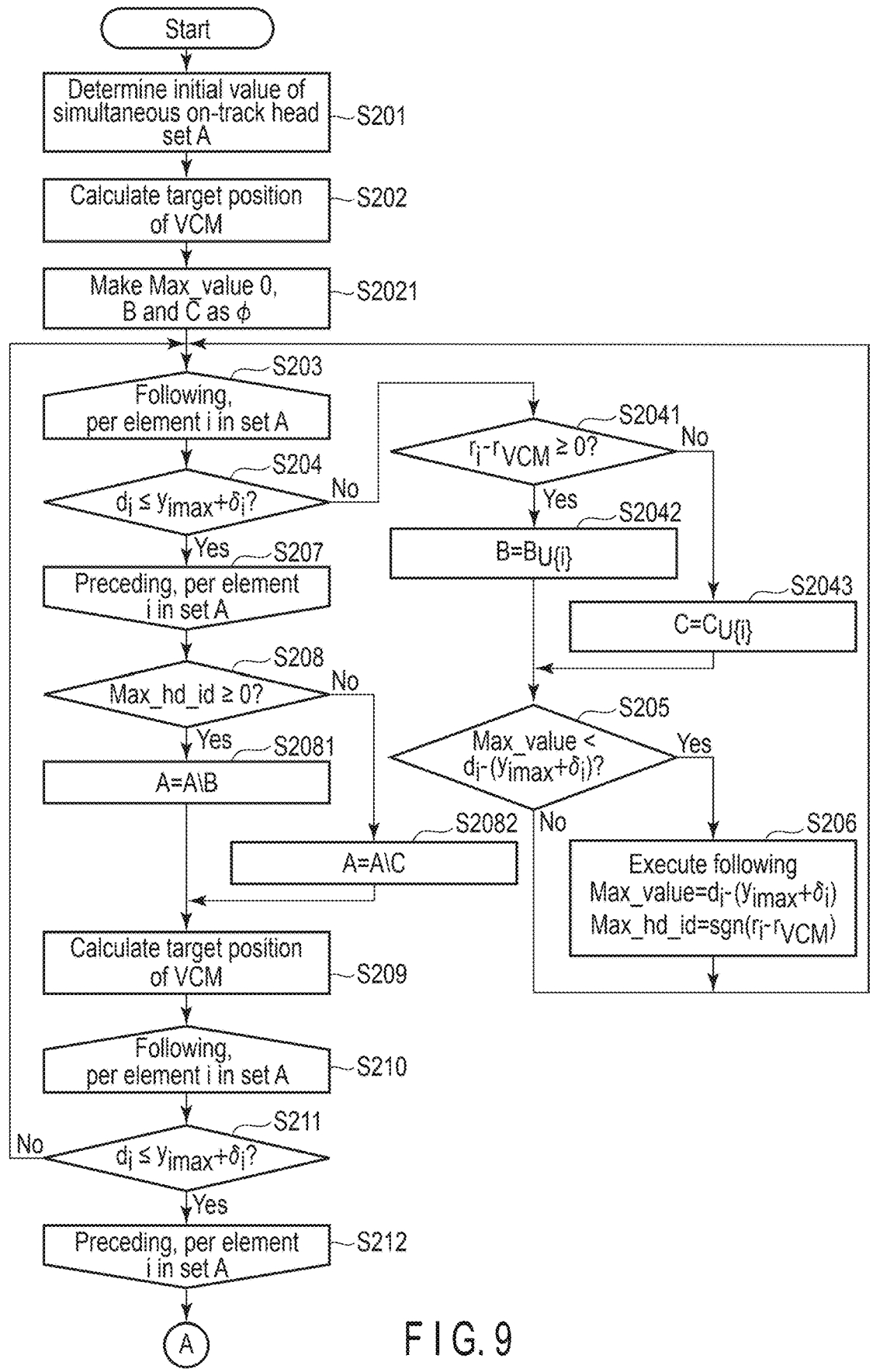
FIG. 9 is a flowchart showing processing operations in a case where a magnetic disk device of a second embodiment controls the plurality of heads.

FIG. 9 is the flowchart showing processing operations in a case where the magnetic disk device of the second embodiment controls the plurality of heads.

The difference between FIG. 9 and FIG. 6, which is the flowchart for the first embodiment, is in the processes to determine the set A in a step S2021 to a step S2081. Thus, this processes will be mainly described and the portions common to FIG. 9 and FIG. 6 will not be described.

A simultaneous on-track head determination unit 631 is triggered by a simultaneous read and write request and the like to determine the set A, which includes the heads 19 to be simultaneously positioned on their respective target tracks and simultaneously made to perform read and write operations, as initial values and transmits the determined set A to a VCM target position determination unit 6311 (Step S201). The VCM target position determination unit 6311 uses a target position $r_i$ of a head 19 [i] in the set A to acquire the target position $r_{VCM}$ of the VCM using Equation 1 (Step S202).

Each of FIG. 10A, FIG. 10B, and FIG. 10C is a schematic diagram for explaining method of the magnetic disk of the second embodiment selecting a head to be processed among the plurality of heads. The horizontal axis indicates the position in the radial direction, and the X marks show the target position in the radial direction for each of the heads 19. For the sake of simplicity, $y_{imax}+\delta_i$ is common to the all of the heads in FIG. 10A, FIG. 10B, and FIG. 10C.

FIG. 10A shows the positions in the radial direction of the heads 19 in the set A determined in the step S201. For example, heads 19 [ID21], [ID22], and [ID23] are out of a scope of + ($y_{imax}+\delta_i$) centered on the $r_{VCM}$. Among these heads, the head 19 [ID21] is farthest from the $r_{VCM}$. The simultaneous on-track head determination unit 631 executes the processes from step S203 to update the set A.

In the steps S203 and S207, the process is repeated for the head 19 [i] in the set A with using i as a variable. Prior to these steps, Max_value used in the process is initialized as 0, and sets B and C are initialized as empty sets (Step S2021).

The simultaneous on-track head determination unit 631 verifies the conditional expression in Equation 4 (Step S204).

When the head 19 [i] does not satisfy Equation 4 (No in Step S204), the simultaneous on-track head determination unit 631 verifies whether $r_i-r_{VCM} \geq 0$ is satisfied (Step S2041). When the condition in the step S2041 is satisfied, the head 19 [i] is to be included in the set B (step S2042). When the condition in the step S2041 is not satisfied, the head 19 [i] is to be included in the set C (step S2043).

$di-(y_{imax}+\delta_i)$ is compared with the internal variable Max_value (initial value 0). When $di-(y_{imax}+\delta_i)$ is greater than Max_value, sgn $(r_i-r_{VCM})$ is assigned to Max_hd_id as Max_value=$di-(y_{imax}+\delta_i)$ (Step S206). sgn (x) indicates the positive and negative sign (+, −) of a number x.

After performing the above processes (Steps S203 to S207) on all of the elements in the set A, the simultaneous on-track head determination unit 631 verifies whether Max_hd_id>0 is satisfied (Step S208). When Max_hd_id>0 is satisfied, the elements in the set B is removed from the set A to make a new set A (Step S2081). When Max_hd_id>0 is not satisfied, the elements in the set C is removed from the set A to make a new set A (Step S2082). By the above procedure, the head 19 [ID21] farthest from the $r_{VCM}$, and the head 19 [ID22] in the same radial direction as the head 19 [ID21] with respect to the $r_{VCM}$ can be removed from the set A.

FIG. 10B shows the position of the heads 19 in the set A in the radial direction after removing the head 19 [ID21] and the head 19 [ID22] from the set A. The $r2_{VCM}$ is the target position of the VCM determined by the VCM target position determination unit 6311 for the set A in the step S209.

The processes from the step S210 are executed for the heads 19 in the set A. For example, when No is obtained in the process in the step S211 for the head 19 [ID23] (No in Step S211), the procedure returns to the step S203 and the processes is to be repeated. The step S210 to the step S212 may be performed repeatedly and sequentially (For loop execution) for the heads 19 in the set A until No is obtained in the step S211 and the repeated process may be stopped when No is obtained in the step S211.

In other words, by processes in the steps S210 to S212, the simultaneous on-track head determination unit 631 detects heads 19 that do not satisfy the condition of Equation 4 centered on the target position $r_{VCM}$ of the VCM (corresponding to the $r2_{VCM}$ in FIG. 10B) that is newly calculated for the heads 19 in the set A.

For example, in the example in FIG. 10B, the head 19 [ID 23] is detected by processes in the steps S210 to S212 and the procedure returns to the step S203.

In the reprocesses from the step S203, the simultaneous on-track head determination unit 631 verifies the condition in the step S204 for the heads 19 in the set A using the newly calculated target position $r_{VCM}$ of the VCM (r2CM in the example in FIG. 10B). Therefore, as shown in the example in FIG. 10B, in the reprocessing from the steps S203 to S207, the simultaneous on-track head determination unit 631 detects that the head 19 [ID23] does not satisfy the condition in the step S204. As a result, as shown in the example in FIG. 10C, the set A becomes a set from which the head 19 [ID23] is newly removed, in other words, a set corresponding to the initial value of the set A from which the head 19 [ID21], the head 19 [ID21], and the head 19 [ID23] are removed.

Next, the $r_{VCM}$ (corresponding to the $r3_{VCM}$ in FIG. 10C) is newly calculated in the step S209 as the target position of the VCM for the set A. As shown in the example in FIG. 10C, all of the heads 19 [i] are within $\pm (y_{imax}+\delta_i)$ centered on the newly calculated target position $r3_{VCM}$ for the VCM. Thus, there is no need to proceed to No in the steps S210 to S212, and the procedure proceeds to the next step. Similarly to the steps after the step S113 in FIG. 7, the subsequent steps regard the set A of the heads 19 as the final set A and execute the processes from the step S113 in the latter steps for the final set A.

By the above procedure, the magnetic disk drive of the present embodiment controls the input voltage to all of MAs 17 [i] [j] of the heads 19 [i] to be simultaneously positioned on their respective target tracks so as not to exceed the maximum voltage $V_{ijmax}$. In other words, the magnetic disk drive of the present embodiment can perform simultaneous positioning on their respective target tracks of the plurality of heads 19 more efficiently in terms of calculation, considering restriction of the microactuator voltage for all of the MAs 17 [i] [j].

Third Embodiment

The present embodiment shows an example of a magnetic disk drive that uses a target position $r_{VCM}$ of a VCM as a reference to remove all heads 19 whose position in the radial direction do not satisfy the condition of simultaneous positioning on their respective target tracks from the target of the simultaneous tracking control (set A).

Figure 11:
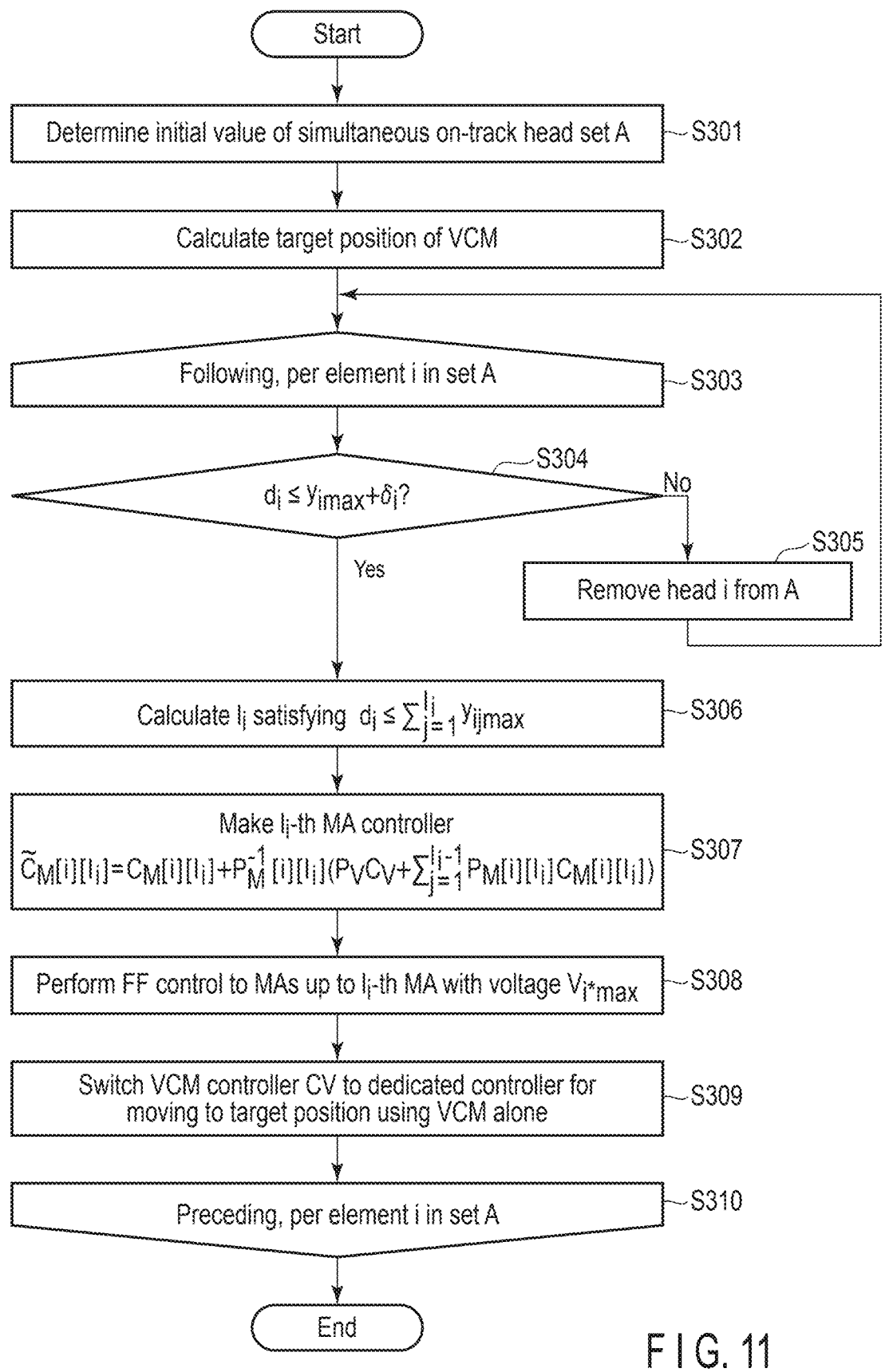
FIG. 11 is a flowchart showing processing operations in a case where a magnetic disk drive of a third embodiment controls a plurality of heads.

FIG. 11 is a flowchart showing processing operations in a case where a magnetic disk drive of a third embodiment controls a plurality of heads.

The present embodiment is different from the first embodiment and the second embodiment in the condition for removing heads 19, which are not a target of the simultaneous tracking control, from the set A. Therefore, the detailed description of the same processes as those in the flowchart (FIG. 6 and FIG. 9) will be omitted.

Figure 12A:
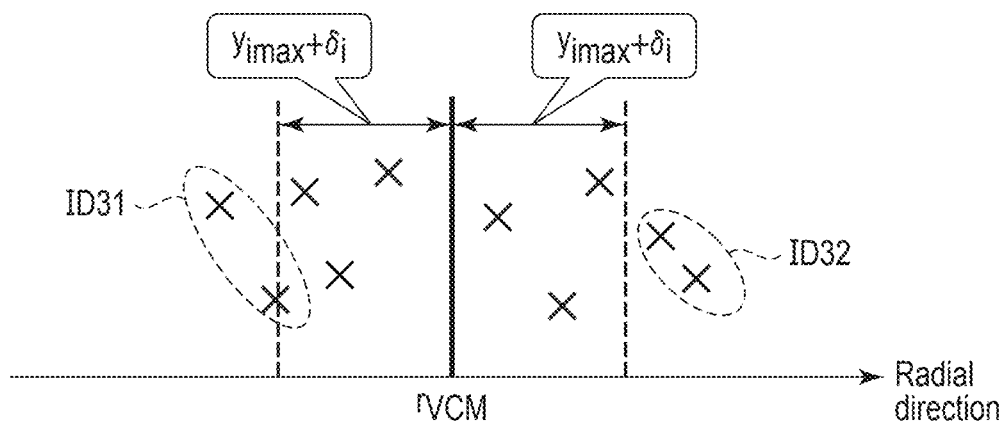
FIG. 12B is a schematic diagram for explaining the method of the magnetic disk drive of the third embodiment selecting heads that are simultaneously positioned on their respective target tracks to perform read and write operations simultaneously from among the plurality of heads.
Figure 12B:
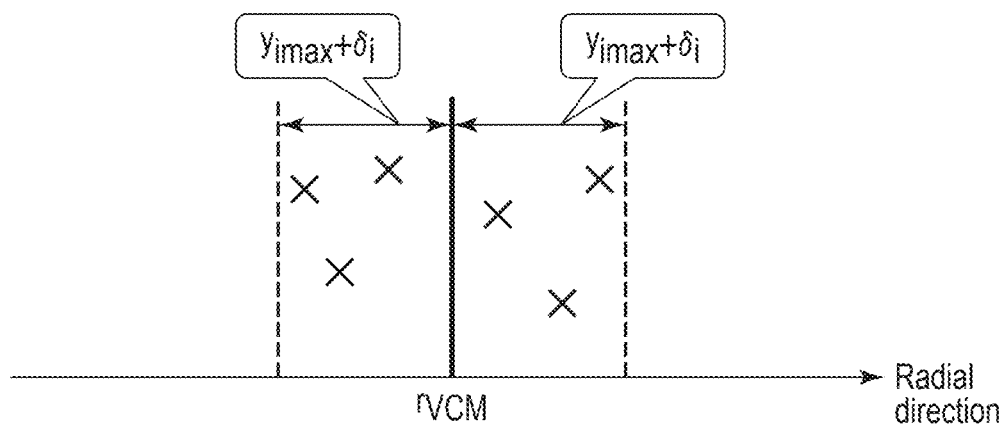

Each of FIG. 12A and FIG. 12B is a schematic diagram for explaining method of the magnetic disk drive of the third embodiment selecting a head of the target of the simultaneous tracking control from among the plurality of heads. The horizontal axis indicates the position in the radial direction, and the X marks show the target position in the radial direction for each of the heads 19.

FIG. 12A shows the position in the radial direction of the heads 19 in the set A, determined in the step S301. FIG. 12A shows, for example, heads 19 [ID31] and heads 19 [ID32] are out of the scope of $+(y_{imax}+\delta_i)$ centered on the $r_{VCM}$. The heads 19 [ID31] and the heads 19 [ID32] are removed by the processes shown in the flowchart in FIG. 11.

More specifically, when the head 19 [i] does not satisfy Equation 4 (No in Step S304), the head 19 [i] is removed from the set A. In contrast, when the head 19 [i] satisfies Equation 4 in the step S304 (Yes in Step S304), the switching operation of the controller for the head 19 [i] is determined (processes in Steps S306 to S309). The processes in the step S306 to the step S309 are the same as the processes in the step S114 to the step S117 shown in FIG. 7, and thus the detailed descriptions thereof are omitted here.

As described above, by performing the processes in the step S303 to the step S309 for all of the heads 19 in the set A, a final set A in which all of the heads 19 are within the scope of + $(y_{imax}+\delta_i)$ centered on the $r_{VCM}$ can be generated as shown in FIG. 12B. The present embodiment can generate the final set without recalculation of the $r_{VCM}$.

By the above procedure, the magnetic disk drive of the present embodiment can easily control the plurality of heads 19 considering the stroke restriction of all of the MAs 17 included in each of the plurality of heads 19.

At least one embodiment described above can provide the magnetic disk drive with a multi-stage actuator system that considers the stroke restriction of the microactuators. The magnetic disk drive of at least one embodiment described above has a function to switch the controllers of the VCM 13 and the MAs 17 (for example, $C_V$ and $C_M$ in FIG. 4) so as not to lose the accuracy in the positioning by considering the voltage to the MAs 17 during simultaneous positioning on their respective target tracks for the plurality of heads 19 (for example, the control switching unit 63 in FIG. 4).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The processes shown in the flowchart, sequence chart, and the like may be performed by hardware such as a CPU, an IC chip, a digital signal processor (Digital Signal Processor or DSP), software (such as a program) operated in a computer including a microcomputer, or a combination of the hardware and the software. In addition, even if a claim is expressed as control logic, a program including an instruction to urge a computer to be executed, or a computer-readable storage medium storing the instruction, the device of the embodiments is applied to the claim. Furthermore, the names and terms used are not limited, and other expressions are also included in the present invention if they are substantially identical in content and purpose.

What is claimed is:

1. A magnetic disk drive, comprising:
   a plurality of rotatable disks, each of the disks being a magnetic recording medium;
   a plurality of heads, each of the heads being capable of independently performing simultaneous read and write of data for a certain position of the plurality of disks;
   a plurality of microactuators, one or more of the microactuators being included in each of the plurality of heads and all of the microactuators being capable of driving independently;
   a voice coil motor (VCM) that moves the plurality of heads to a predetermined position on the disk;
   a simultaneous on-track head determination unit determining a final set of heads which are to be simultaneously positioned on their respective target tracks from among the plurality of heads is determined, by using at least a displacement amount of the plurality of microactuators;

a VCM target position determination unit determining a target position of the VCM when the heads in the final set are simultaneously positioned on their respective target tracks;

a VCM control switching unit switching a controller of the VCM when the heads in the final set are simultaneously positioned on their respective target tracks; and a microactuator control switching unit switching controllers of the microactuators included in each of the heads in the final set determined by the simultaneous on-track head determination unit.

2. The magnetic disk device of claim 1, wherein the simultaneous on-track head determination unit determines the final set based on a first set of heads that are specified by a simultaneous read and write request from an outside.

3. The magnetic disk device of claim 1, wherein the simultaneous on-track head determination unit determines a first set of heads to be simultaneously positioned on their respective target tracks simultaneously based on a data access request received from an outside and determines the final set based on the first set.

4. The magnetic disk device of any one of claims 2 to 3, wherein the first head included in the final set comprises one or more first microactuators controlling the first head, and when target positions of the one or more first microactuators exceed an absolute value of a difference between the target position of the VCM and a sum of a maximum displacement amount of the one or more first microactuators, the head determination unit removes the first head from the first set.

5. The magnetic disk device of claim 1, wherein the VCM target position determination unit determines the target position of the VCM based on target positions of all of heads included in the final set.

6. The magnetic disk device of claim 1, wherein the VCM performs control based on a VCM target position determined by the VCM target position determination unit, a target position of a second head included in the final set, and a total displacement amount of one or more second microactuators controlling the second head.

7. The magnetic disk device of claim 1, wherein based on a maximum displacement amount of one or more third microactuators that control a third head included in the final set, the microactuator control switching unit determines first type microactuators to which a maximum voltage that can be applied under feed-forward control is applied or second type microactuators to be controlled by switching to a controller that considers original characteristics of a VCM control system and microactuator control systems which decided to perform feed-forward control and switches the controller.

8. The magnetic disk device of claim 7, wherein the microactuator control switching unit controls input voltages to one or more fourth microactuators controlling a fourth head included in the final set such that the input voltages to the one or more fourth microactuators do not exceed a maximum voltage, which a maximum input voltage predetermined for each of the fourth microactuators.

* * * * *